(12) United States Patent
Ishizuka et al.

(10) Patent No.: US 9,099,770 B2
(45) Date of Patent: Aug. 4, 2015

(54) COMMUNICATION TERMINAL DEVICE AND MANUFACTURING METHOD THEREOF

(71) Applicant: Murata Manufacturing Co., Ltd., Nagaokakyo-shi, Kyoto-fu (JP)

(72) Inventors: Kenichi Ishizuka, Nagaokakyo (JP); Noboru Kato, Nagaokakyo (JP); Koji Shiroki, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 14/047,339

(22) Filed: Oct. 7, 2013

(65) Prior Publication Data
US 2014/0091971 A1  Apr. 3, 2014

Related U.S. Application Data

(63) Continuation of application No. PCT/JP2012/081939, filed on Dec. 10, 2012.

(30) Foreign Application Priority Data

Dec. 16, 2011  (JP) .................................. 2011-276147

(51) Int. Cl.
*H01Q 1/24* (2006.01)
*H01Q 1/22* (2006.01)
(Continued)

(52) U.S. Cl.
CPC . *H01Q 1/22* (2013.01); *H01Q 1/52* (2013.01); *H01Q 1/243* (2013.01); *H01Q 9/40* (2013.01); *H04M 1/0277* (2013.01); *Y10T 29/49018* (2015.01)

(58) Field of Classification Search
CPC ............ H01Q 1/243; H01Q 9/42; H01Q 1/38

USPC ........... 343/702, 841, 853, 893, 700 MS, 846
See application file for complete search history.

(56) References Cited

U.S. PATENT DOCUMENTS 6,933,902 B2 *  8/2005  Yeh ............................... 343/762
6,954,180 B1 * 10/2005  Braun et al. .................. 343/702
(Continued)

FOREIGN PATENT DOCUMENTS

| CN | 101764282 A | 6/2010 |
|---|---|---|
| CN | 101953023 A | 1/2011 |

(Continued)

OTHER PUBLICATIONS

Official Communication issued in corresponding Chinese Patent Application No. 201280013785.5, mailed on May 5, 2014.

(Continued)

*Primary Examiner* — Dameon E Levi
*Assistant Examiner* — Hasan Islam
(74) *Attorney, Agent, or Firm* — Keating & Bennett, LLP

(57) ABSTRACT

A communication terminal device includes a printed wiring board disposed in a casing, a feed pattern provided on a main surface of the printed wiring board, a radiation plate including a substantially planar radiation portion substantially perpendicular to the main surface of the printed wiring board and a lead portion connecting the radiation portion to the feed pattern, and a component mounted on the main surface of the printed wiring board to overlap the lead portion when the main surface of the printed wiring board is viewed from above, the component including a conductive material, a magnetic material and/or a dielectric material. The radiation portion is connected to the lead portion at a side spaced away from the main surface of the printed wiring board, and an area of the lead portion is located at a predetermined distance from the main surface of the printed wiring board.

22 Claims, 11 Drawing Sheets

(51) Int. Cl.
*H01Q 1/52* (2006.01)
*H04M 1/02* (2006.01)
*H01Q 9/40* (2006.01)

(56) References Cited

U.S. PATENT DOCUMENTS

| | | | |
|---|---|---|---|
| 6,992,627 B1 * | 1/2006 | Honda et al. | 343/700 MS |
| 7,242,364 B2 * | 7/2007 | Ranta | 343/860 |
| 7,345,638 B1 * | 3/2008 | Tan et al. | 343/702 |
| 7,379,021 B2 * | 5/2008 | Lee | 343/700 MS |
| 7,616,158 B2 * | 11/2009 | Mak et al. | 343/700 MS |
| 7,764,236 B2 * | 7/2010 | Hill et al. | 343/702 |
| 7,952,529 B2 * | 5/2011 | Huang et al. | 343/702 |
| 8,791,863 B2 * | 7/2014 | Seo et al. | 343/702 |
| 2007/0279291 A1 * | 12/2007 | Tsai et al. | 343/700 MS |
| 2009/0273523 A1 | 11/2009 | Sakuma | |
| 2010/0156738 A1 | 6/2010 | Pu et al. | |
| 2012/0319916 A1 | 12/2012 | Gears et al. | |

FOREIGN PATENT DOCUMENTS

| | | |
|---|---|---|
| GB | 2 390 957 A | 1/2004 |
| JP | 2006-013623 A | 1/2006 |
| JP | 2008-160411 A | 7/2008 |
| JP | 2009-272685 A | 11/2009 |
| JP | 2011-512740 A | 4/2011 |

OTHER PUBLICATIONS

Official Communication issued in International Patent Application No. PCT/JP2012/081939, mailed on Mar. 12, 2013.

* cited by examiner

F I G . 3
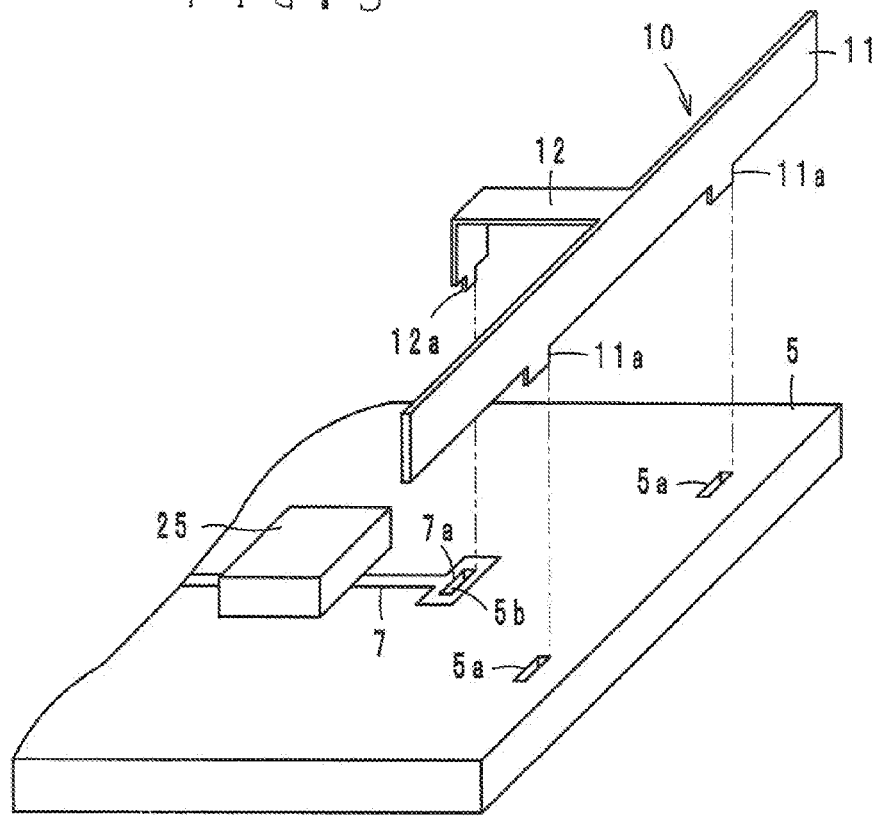
F I G . 4
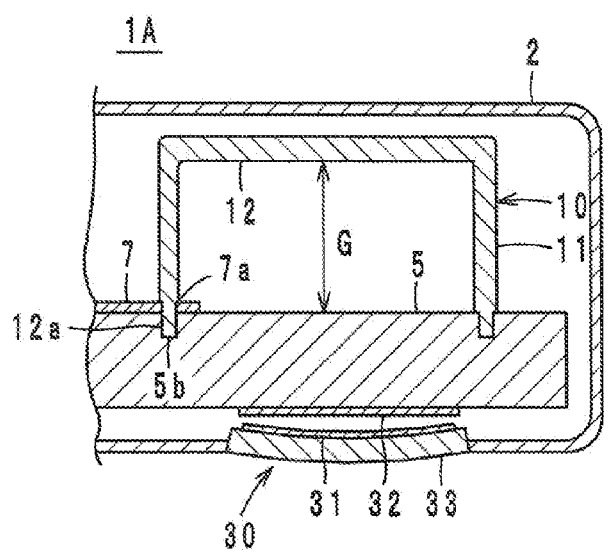

F I G. 5
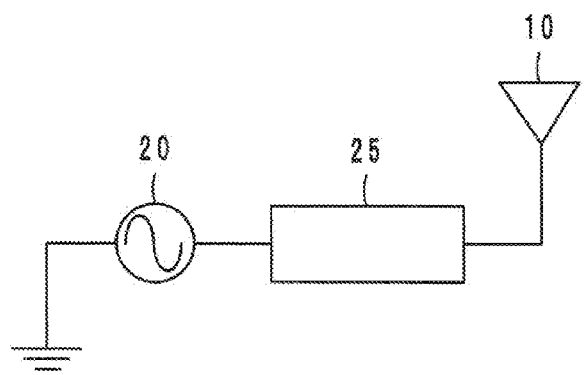
F I G. 6
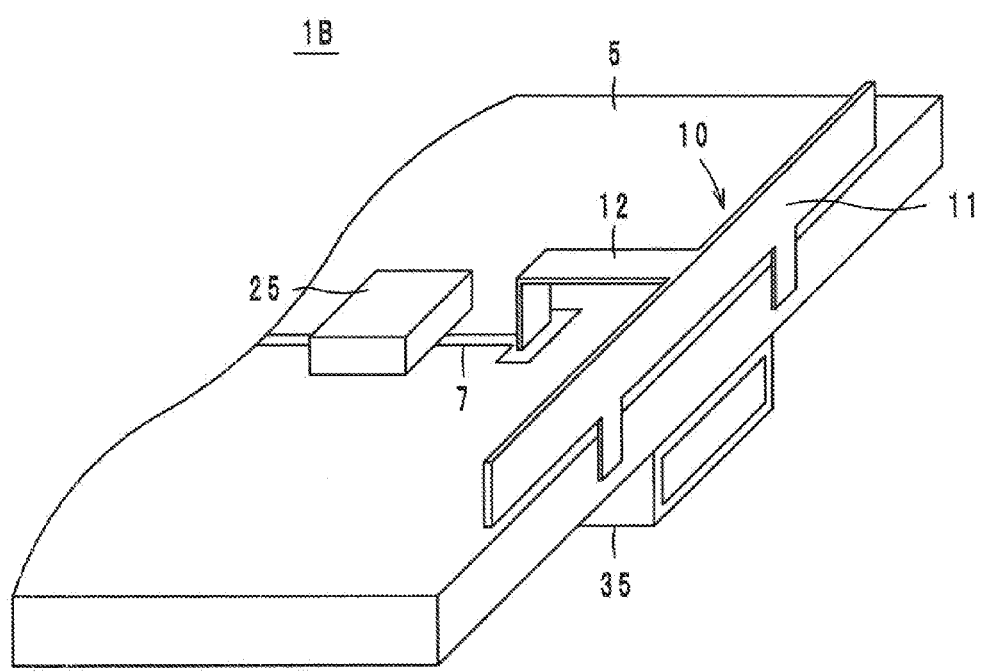

F I G . 7
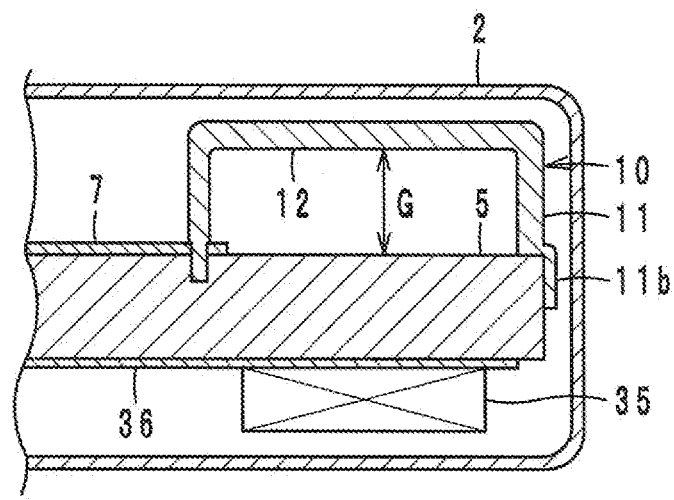
F I G . 8
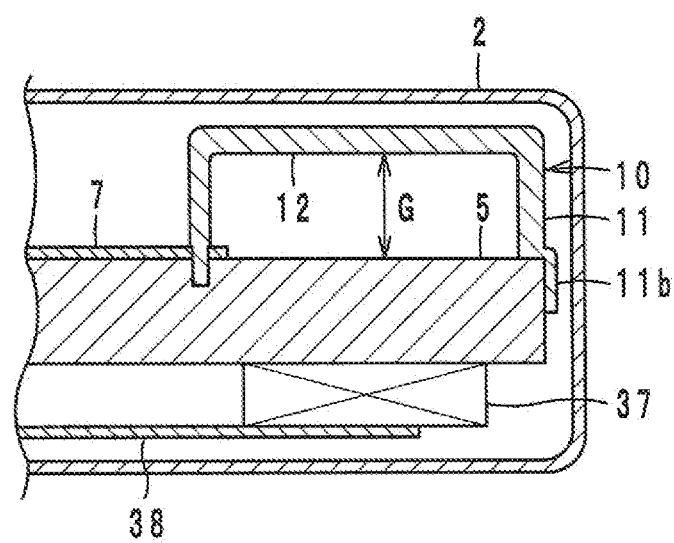

F I G . 1 3 A
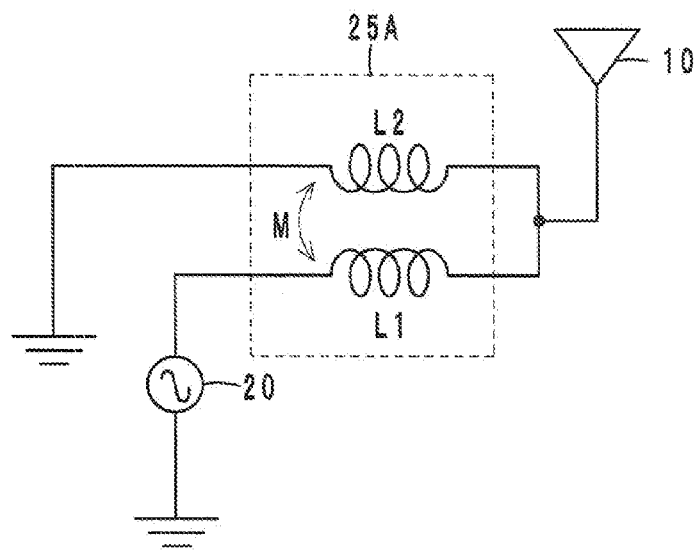
F I G . 1 3 B
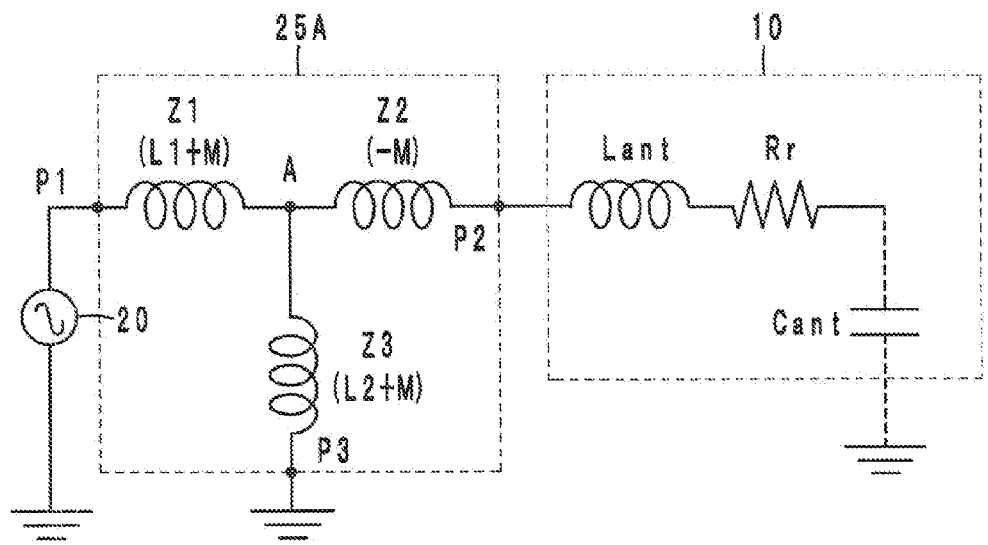

F I G . 1 5 A
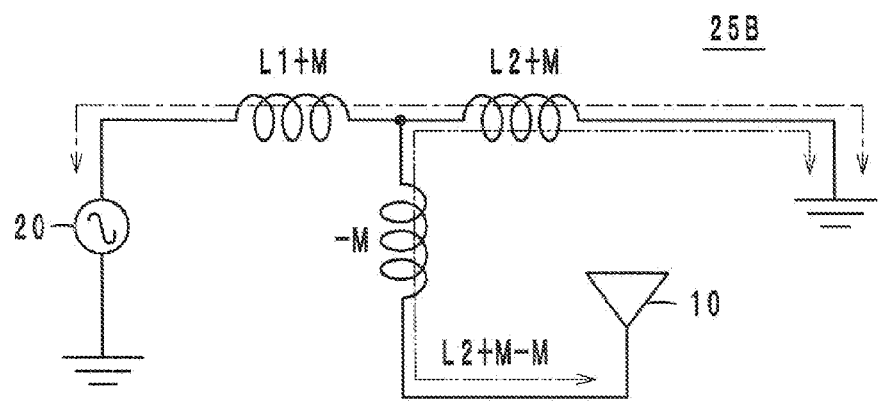
F I G . 1 5 B
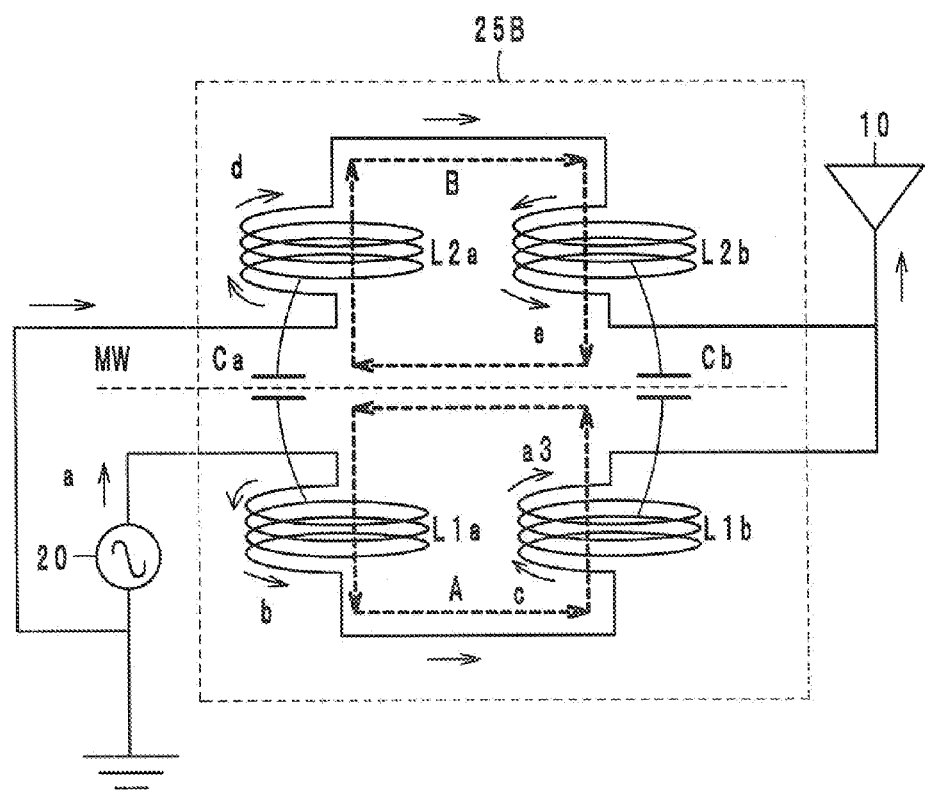

F I G . 1 7
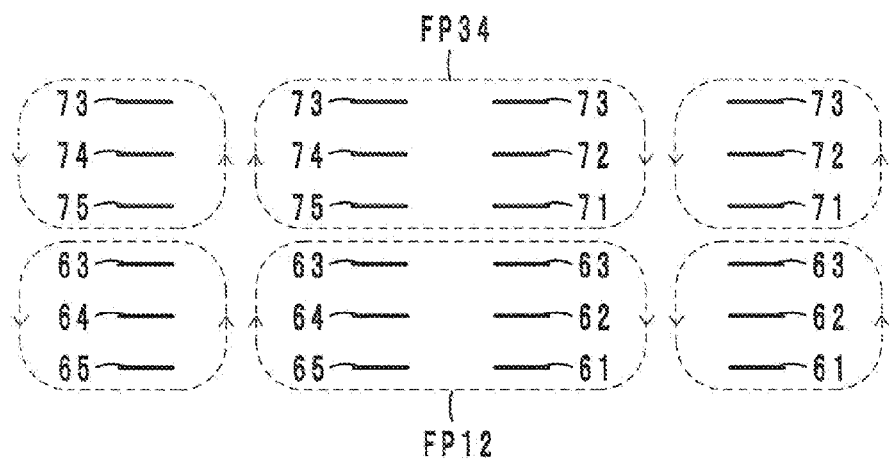
F I G . 1 8
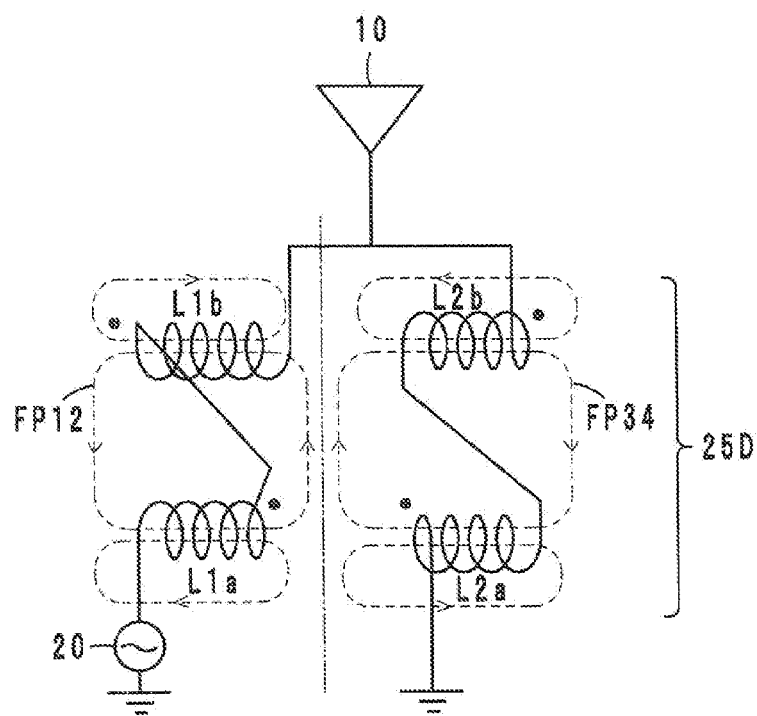

COMMUNICATION TERMINAL DEVICE AND MANUFACTURING METHOD THEREOF

BACKGROUND OF THE INVENTION

1. Field of the Invention

The present invention relates to a communication terminal device, and more particularly, to a mobile communication terminal device, such as a cellphone, and a manufacturing method thereof.

2. Description of the Related Art

In recent years, a mobile communication terminal device with a sheet-metal antenna made of a thin metal sheet mounted on a printed wiring board has been known (see, for example, Japanese Patent Laid-Open Publication No. 2006-13623). On one main surface of this type of printed wiring board, some components, such as a connector, a key pad, a speaker, etc. including a conductor, a magnetic material and/or a dielectric material, are mounted, and on the other main surface of the printed wiring board, the sheet-metal antenna is disposed. The sheet-metal antenna is arranged such that a main surface thereof is perpendicular to the main surfaces of the printed wiring board. This arrangement is intended to minimize the effects of the metal portions of the mounted components on the sheet-metal antenna, that is, to suppress coupling between the metal portions and the sheet-metal antenna via capacity or the like.

A wiring for connecting the sheet-metal antenna and a feed circuit is further provided on the printed wiring board, and depending on the position of the feed circuit and the state of the wiring, the wiring and the mounted components may be coupled with each other, which prevents desired antenna characteristics from being obtained.

SUMMARY OF THE INVENTION

Preferred embodiments of the present invention provide a communication terminal device that significantly reduces or prevents coupling between a radiation plate and a component, which are mounted on a printed wiring board, to prevent degradation of antenna characteristics, and a manufacturing method of the communication terminal device.

A first preferred embodiment of the present invention provides a communication terminal device including a printed wiring board disposed in a casing; a feed pattern provided on a main surface of the printed wiring board; a radiation plate including a planar radiation portion arranged to be perpendicular or substantially perpendicular to the main surface of the printed wiring board and a lead portion arranged to connect the radiation portion to the feed pattern; and a component mounted on the main surface of the printed wiring board in an area that overlaps with the lead portion when the main surface of the printed wiring board is viewed from above, the component including a conductive material, a magnetic material and/or a dielectric material; wherein the radiation portion is connected to the lead portion at aside spaced away from the printed wiring board; and the lead portion, in the area overlapping with the component when the main surface of the printed wiring board is viewed from above, is located at a predetermined distance from the main surface of the printed wiring board.

In the communication terminal device, the lead portion, which connects the feed pattern to the radiation portion, in the area overlapping with the component when the main surface of the printed wiring board is viewed from above, is located at a predetermined distance from the main surface of the printed wiring board. Therefore, coupling between the lead portion and the conductive material, the magnetic material and/or the dielectric material included in the component is significantly reduced or prevented, and degradation of the antenna characteristics is prevented.

A second preferred embodiment of the present invention provides a method for manufacturing the above-described communication terminal device, and in the method, the lead portion is sucked by a suction nozzle and is placed on the printed wiring board.

This method leads to automation of the mounting of the radiation plate on the printed wiring board, and this facilitates a manufacturing process of a communication terminal device that prevents degradation of the antenna characteristics.

In a communication terminal device according to a preferred embodiment of the present invention, coupling between a radiation plate and a component that are mounted on a printed wiring board is significantly reduced or prevented, and degradation of the antenna characteristics is prevented.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 3 is a perspective view of the printed wiring board and a radiation plate of the communication terminal device according to the first preferred embodiment of the present invention.

FIG. 4 is a sectional view of the printed wiring board with the radiation plate mounted thereon.

FIG. 5 is a block diagram showing an antenna circuit of the communication terminal device according to the first preferred embodiment of the present invention.

FIG. 6 is a perspective view of an essential portion of a communication terminal device according to a second preferred embodiment of the present invention.

FIG. 7 is a sectional view of a printed wiring board with a radiation plate mounted thereon in the communication terminal device according to the second preferred embodiment of the present invention.

FIG. 8 is a sectional view of a modification of the second preferred embodiment of the present invention.

FIGS. 13A and 13B are a block diagram and an equivalent circuit diagram, respectively, of a first exemplary impedance converting circuit.

FIGS. 15A and 15B are a circuit diagram showing the transformer ratio based on the equivalent circuit shown by FIG. 14B and an illustration showing the effects, respectively.

FIG. 17 shows major magnetic fluxes flowing through coil elements defined by the conductive coil patterns shown in FIG. 16.

FIG. 18 is a block diagram of a fourth exemplary impedance converting circuit.

DETAILED DESCRIPTION OF THE PREFERRED EMBODIMENTS

Figure 1:
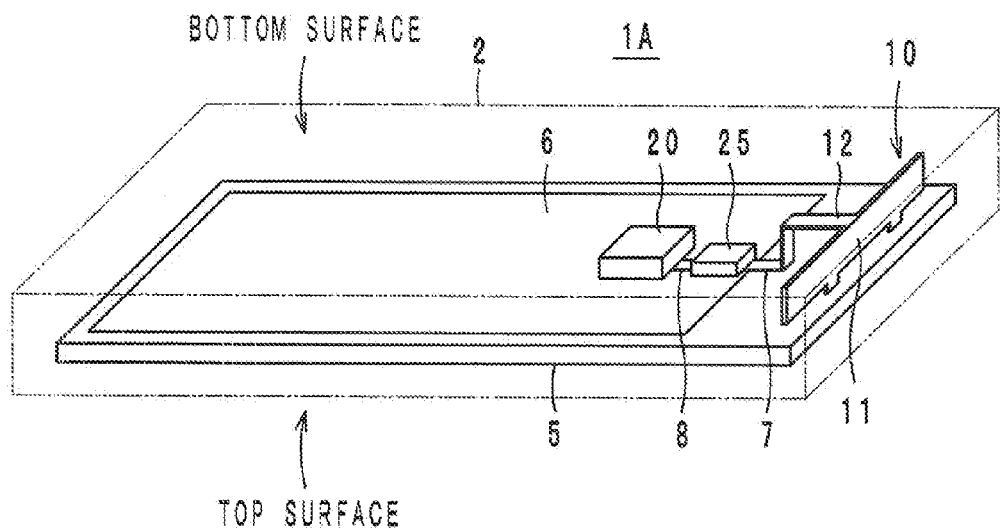
FIG. 1 is a perspective view of a communication terminal device according to a first preferred embodiment of the present invention.

Communication terminal devices according to some preferred embodiments of the present invention are hereinafter described with reference to the accompanying drawings. In the drawings, the same elements and members are provided with the same reference marks, and repetitious descriptions are avoided.

First Preferred Embodiment

A communication terminal device 1A according to a first preferred embodiment preferably is compatible with a multi-band type, such as a dual-band type, a triple-band type, a quad-band type, a penta-band type, etc., and is also compatible with a broadband system such as LTE (Long Term Evolution).

The communication terminal device 1A, as shown by FIG. 1, includes a casing 2 preferably in the shape of a rectangular or substantially rectangular parallelepiped, and a printed wiring board 5 incorporating various circuits (not shown), such as a power circuit, a control circuit, etc., is disposed in the casing 2, near a front surface of the casing 2. On the printed circuit board 5, chip-type active components and chip-type passive components are provided (although not shown), and further, a wiring that connects these components is provided.

On a main surface (a bottom surface) of the printed circuit board 5, a large grounding pattern 6, and feed patterns 7 and 8 are provided, and a radiation plate 10 is mounted. The feed pattern 8 connects a feed circuit 20 and an impedance converting circuit 25. The feed pattern 7 connects the impedance converting circuit 25 and the radiation plate 10. The feed patterns 7 and 8 are insulated from the grounding pattern 6.

FIG. 5 schematically shows an antenna circuit. The impedance converting circuit 25 will be described later.

The radiation plate 10 preferably is formed by bending a single thin metal sheet, for example. The radiation plate 10 includes a planar radiation portion 11 that is perpendicular or substantially perpendicular to a main surface of the printed wiring board 5, and a lead portion 12 that connects the radiation portion 11 to the feed pattern 7. As the material of the radiation plate 10, phosphor bronze is preferably used, and alternatively, copper, aluminum, stainless steel or the like plated with nickel, silver, gold or the like can be used, for example. The radiation portion 11 is connected to the lead portion 12 at a location spaced away from the main surface of the printed wiring board 5, that is, at its upper edge. More specifically, the radiation portion 11 has a long-side direction that is parallel or substantially parallel to the main surface of the printed wiring board 5 and a short-side direction that is perpendicular or substantially perpendicular to the main surface. Both ends of the radiation portion 11 in the long-side direction are open ends, and the radiation portion 11 is connected to the lead portion 12 at the center or substantially at the center in the long-side direction.

Figure 2A:
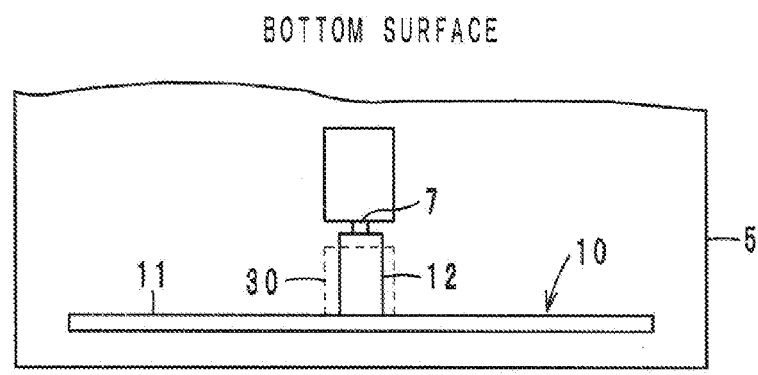
FIGS. 2A and 2B are a bottom view and a top view, respectively, of a printed wiring board of the communication terminal device according to the first preferred embodiment of the present invention.
Figure 2B:
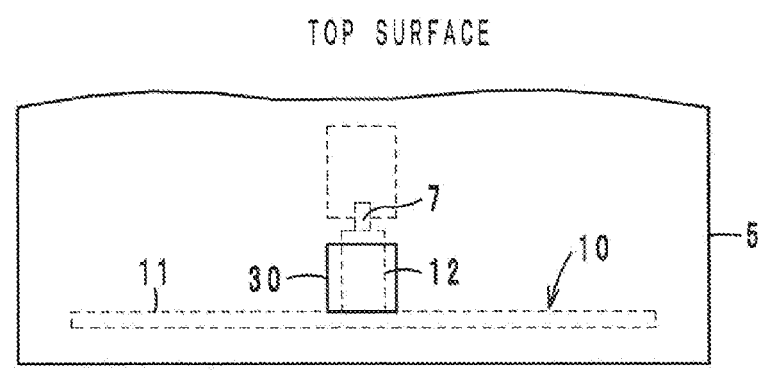

On the other main surface (a top surface) of the printed wiring board 5, a camera (not shown) and a key pad 30 (see FIG. 4) are provided. The key pad 30, which is, for example, a switch that turns on and off the power of the communication terminal device 1A, includes contact members 31 and 32 including conductive films and a resin film 33. The key pad 30 includes a conductive material and a dielectric material, and as shown by FIGS. 2A and 2B, the key pad 30 is disposed on the main surface of the printed wiring board 5 in an area so as to overlap with the lead portion 12 when viewed from the top-bottom direction. The lead portion 12, in the area overlapping with the key pad 30, is parallel or substantially parallel to the main surface of the printed wiring board 5 with a predetermined gap G (see FIG. 4) between the lead portion 12 and the main surface of the printed wiring board 5.

The radiation plate 10 includes holding portions 11a projecting from the lower edge of the radiation portion 11, and by fitting of the holding portions 11a in depressed portions 5a provided in the main surface of the printed wiring board 5, the radiation plate 10 is fixed to the printed wiring board 5. An end 12a of the lead portion 12 is inserted in a depressed portion 5b located in the main surface of the printed wiring board 5 through a hole 7a in the feed pattern 7, and by soldering of the end 12a to the feed pattern 7, the lead portion 12 is connected and fixed to the feed pattern 7.

The radiation portion 11 sends and receives high-frequency signals (radio signals). The radiation portion 11 receives differentially-fed power from the feed circuit 20 via the impedance converting circuit 25, thus functioning as a mono-pole antenna. The feed circuit 20 preferably is a semiconductor integrated circuit that incorporates signal processing circuits, such as an RF circuit, a BB circuit, etc. In the communication terminal device 1A, the lead portion 12, which connects the feed pattern 7 located on the printed wiring board 5 to the radiation plate 10, in the area overlapping with the key pad 30 when viewed from the top-bottom direction, is arranged at a predetermined distance G from the main surface of the printed wiring board 5. Accordingly, coupling between the lead portion 12 and the conductive material and the dielectric material included in the key pad 30 is significantly reduced or prevented, and degradation of the antenna characteristics is prevented. Although the lead portion 12 is a lead pattern that connects the radiation portion 11 to the feed pattern 7, technically, the lead portion 12 also operates to send and receive high-frequency signals.

Both ends of the radiation portion 11, which are open ends and where the voltage peaks, and the lead portion 12, where the current is concentrated, are spaced away from the key pad 30 including a conductive material, and this is effective to significantly reduce or prevent coupling between the radiation plate 10 and the conductive material. Moreover, the radiation plate 10 preferably is formed by bending a single thin metal sheet, and therefore, the radiation plate 10 can be fabricated easily at low cost.

The radiation portion 11 does not need to be straight and planar. The radiation portion 11 may be U-shaped or substantially U-shaped with the both ends bent. Alternatively, when the casing 2 includes round corners, the both ends of the radiation portion 11 may be curved along the round corners, for example.

Second Preferred Embodiment

A communication terminal device 1B according to a second preferred embodiment of the present invention, as shown by FIGS. 6 and 7, includes a connector 35 on the top surface of the printed wiring board 5. As is the case with the key pad 30, the connector 35 is located in an area so as to overlap with the lead portion 12 when viewed from the top-bottom direction. The lead portion 12, in the area overlapping with the connector 35, is parallel or substantially parallel to the main surface of the printed wiring board 5 with a predetermined gap G between the lead portion 12 and the main surface of the printed wiring board 5. The lower edge of the radiation portion 11 contacts with the main surface of the printed wiring board 5, and holding portions 11b projecting from the lower edge of the radiation portion 11 engage with an end surface of the printed wiring board 5. As a result, the radiation portion 11 is fixed to the printed wiring board 5. All the other portions and elements of the communication terminal device 1B according to the second preferred embodiment are preferably the same as those of the communication terminal device 1A according to the first preferred embodiment.

The connector 35 incorporates various conductors, including a conductive pattern 36. The portion of the lead portion overlapping with the connector 35 when viewed from the top-bottom direct ion is arranged at a predetermined distance G from the main surface of the printed wiring board 5. Accordingly, coupling between the lead portion 12 and the conductors incorporated in the connector 35 is significantly reduced or prevented, and degradation of the antenna characteristics is prevented.

FIG. 8 shows a modification of the second preferred embodiment of the present invention. In the modification, the connector 35 is replaced by a speaker 37 including a current-carrying conductor 38. The other portions and elements of the modification are preferably the same or substantially the same as those of the communication terminal device 1B according to the second preferred embodiment. The speaker 37 includes a magnetic material; however, coupling between the magnetic material and the lead portion 12 is significantly reduced or prevented.

Third Preferred Embodiment

Figure 9:
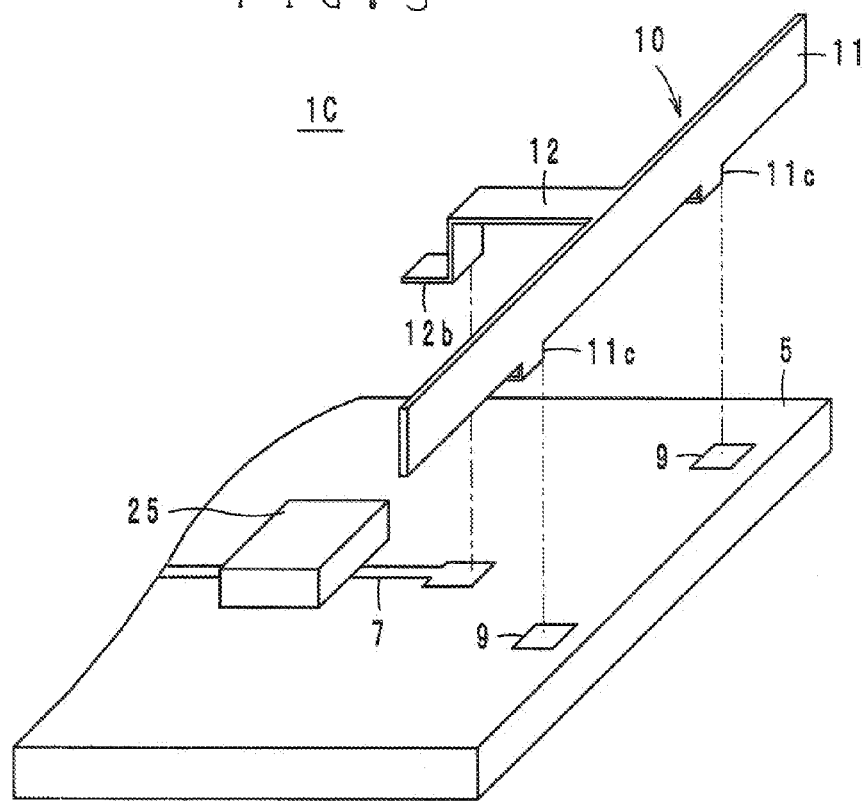
FIG. 9 is a perspective view of an essential portion of a communication terminal device according to a third preferred embodiment of the present invention.
Figure 10:
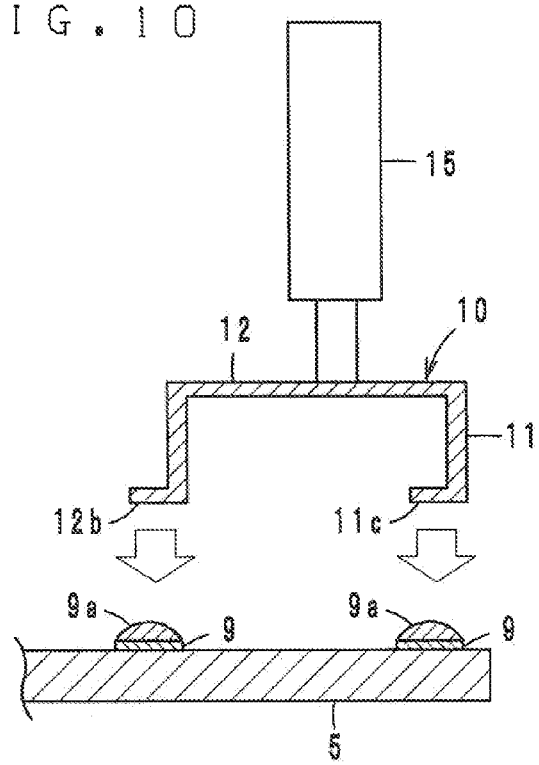
FIG. 10 is a sectional view showing a manufacturing process of the communication terminal device according to the third preferred embodiment of the present invention.

In a communication terminal device 1C according to a third preferred embodiment of the present invention, as shown by FIGS. 9 and 10, holding portions 11c attached to the lower edge of the radiation portion 11 and a lower end 12b of the lead portion 12 are soldered (by solder 9a) to lands 9 and the feed pattern 7, respectively, located on the main surface of the printed wiring board 5. The other portions and elements of the communication terminal device 1C according to the third preferred embodiment preferably are the same or substantially the same as those of the communication terminal device 1A according to the first preferred embodiment, and the communication terminal device 1C basically has the same advantageous effects as the communication terminal device 1A according to the first preferred embodiment. According to the third preferred embodiment, as shown by FIG. 10, in a process of mounting the radiation plate 10 on the printed wiring board 5, the lead portion 12 is sucked by a suction nozzle 15. This facilitates the mounting of the radiation plate 10 on the printed wiring board 15.

Fourth Preferred Embodiment

Figure 11:
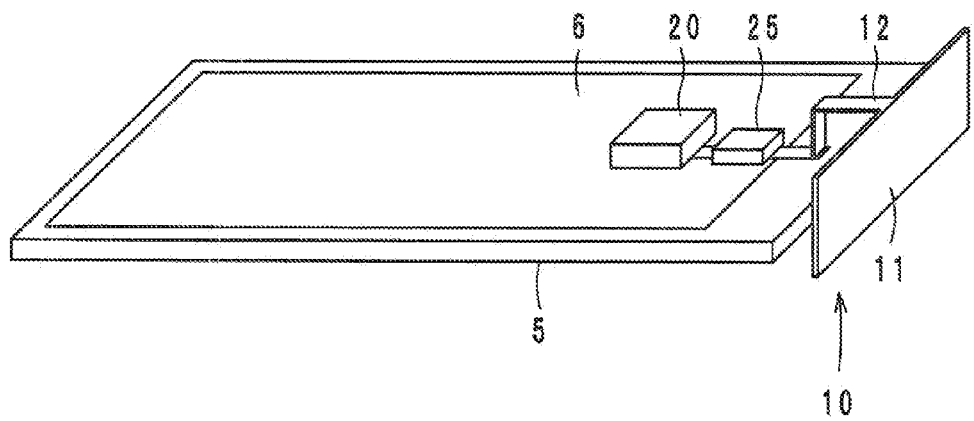
FIG. 11 is a perspective view of a communication terminal device according to a fourth preferred embodiment of the present invention.
Figure 12:
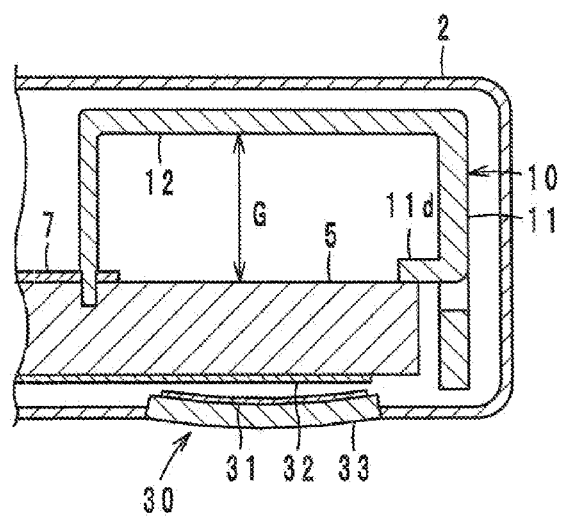
FIG. 12 is a sectional view of a printed wiring board with a radiation plate mounted thereon in the communication terminal device according to the fourth preferred embodiment of the present invention.

In a communication terminal device 1D according to a fourth preferred embodiment of the present invention, as shown by FIGS. 11 and 12, the radiation plate 10 is disposed along an end surface of the printed wiring board 5. The other portions and elements of the communication terminal device 1D are preferably the same or substantially the same as those of the communication terminal device 1A according to the first preferred embodiment, and the communication terminal device 1D has the same advantageous effects as the communication terminal device 1A according to the first preferred embodiment. In the fourth preferred embodiment, a holding portion 11d made by cutting and bending a portion of the radiation portion 11 leans against the edge of the printed wiring board 5, which determines the position of the radiation portion 11. Further, the holding portion 11d is fixed to the printed wiring board 5 by an adhesive or the like, as necessary. In the fourth preferred embodiment, it is preferred that the radiation portion 11 is located as far as possible from the end surface of the printed wiring board 5.

First Exemplary Impedance Converting Circuit

A first exemplary impedance converting circuit 25A is connected between the feed circuit 20 and the radiation plate 10. The impedance converting circuit 25A includes a first inductance element L1 connected to the feed circuit 20, and a second inductance element L2 coupled with the first inductance element L1. One end of the first inductance element L1 is connected to the feed circuit 20, and the other end thereof is connected to the radiation plate 10. One end of the second inductance element L2 is connected to the radiation plate 10, and the other end thereof is grounded.

The inductance elements L1 and L2 are tightly coupled, and equivalent negative inductance is generated. This negative inductance offsets the inductance of the radiation plate 10, and the inductance of the radiation plate 10 appears to become lower. Accordingly, the effective induced reactance of the radiation plate 10 becomes lower, and the operation of the radiation plate is less dependent on the frequency of the high-frequency component.

The impedance converting circuit 25A includes a transformer circuit, wherein the first inductance element L1 and the second inductance L2 are tightly coupled via mutual inductance. This transformer circuit, as shown by FIG. 13B, is equivalently transformed into a T-shaped circuit includes three inductance elements Z1, Z2 and Z3. More specifically, this T-shaped circuit includes a first port P1 to be connected to the feed circuit 20; a second port P2 to be connected to the radiation plate 10; a third port to be grounded; a first inductance element Z1 connected between the first port P1 and a branch point A; a second inductance element Z2 connected between the second port P2 and the branch point A; and a third inductance element Z3 connected between the third port P3 and the branch point A.

When the inductance of the first inductance element, the inductance of the second inductance element and the mutual inductance shown in FIG. 13A are denoted by L1, L2 and M, respectively, the inductance of the first inductance element Z1 shown in FIG. 13B is L1+M, the inductance of the second inductance element Z2 shown in FIG. 13B is −M, and the inductance of the third inductance element Z3 shown in FIG. 13B is L2+M. The inductance of the second inductance element Z2 is a negative value regardless of the values of L1 and L2, and there is generated a pseudo negative inductance component.

The radiation plate 10, as shown by FIG. 13B, equivalently includes an inductance component Lant, a radiation resistance component Rr and a capacitance component Cant. The inductance component Lant of the radiation plate 10 by itself is offset by the negative inductance component −M in the impedance converting circuit 25A. When the radiation plate 10 is viewed from the branch point A, the inductance value of the radiation plate 10 (including the second inductance element Z2) is low (ideally, zero). Accordingly, the impedance frequency characteristic of the radiation plate 10 is low.

In order to generate a negative impedance component, it is necessary that the first inductance element L1 and the second inductance element L2 are tightly coupled with each other. More specifically, the degree of coupling preferably is equal to or greater than about 0.5, and desirably equal to or greater than about 0.7, for example, although it depends on the element values of the inductance elements L1 and L2.

Second Exemplary Impedance Converting Circuit

Figure 14A:
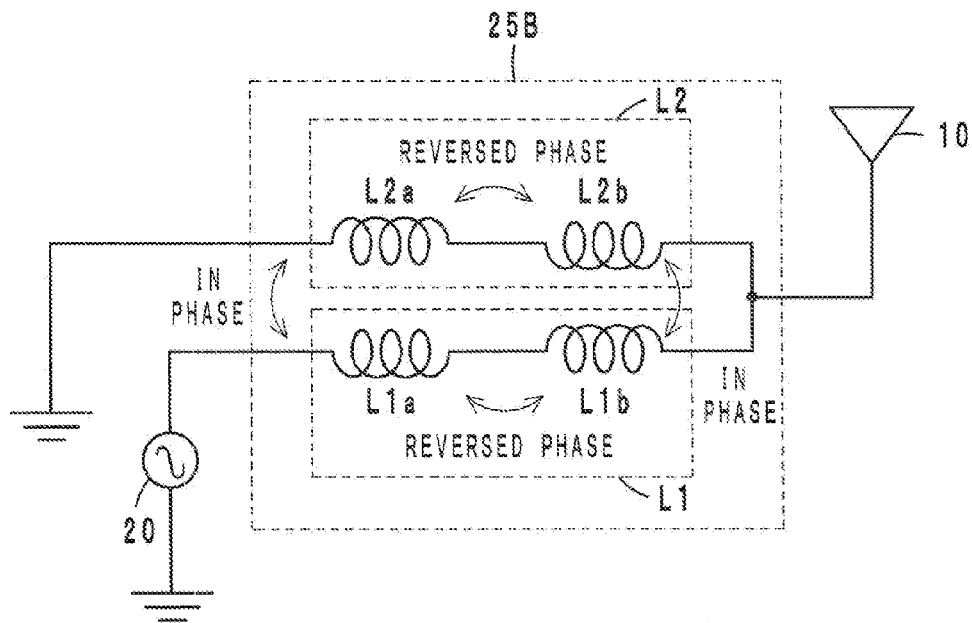
FIGS. 14A and 14B are a block diagram and an equivalent circuit diagram showing coil positions, respectively, of a second exemplary impedance converting circuit.

A second exemplary impedance converting circuit 25B, as shown by FIG. 14A, preferably is basically the same as the first exemplary impedance converting circuit 25A, and is structured such that the first inductance element L1 and the second inductance element L2 are coupled very tightly.

Specifically, the first inductance element L1 includes a first coil element L1a and a second coil element L1b, and these coil elements L1a and L1b are connected in series and are wound to define a closed magnetic path. The second inductance element L2 includes a third coil element L2a and a fourth coil element L2b, and these coil elements L2a and L2b are connected in series and are wound to define a closed magnetic path. In other words, the first coil element L1a and the second coil element L1b are coupled in reversed phase (additive polarity coupling), and the third coil element L2a and the fourth coil element L2b are coupled in reversed phase (additive polarity coupling).

Further, the first coil element L1a and the third coil element L2a are coupled preferably in phase (subtractive polarity coupling), and the second coil element L1b and the fourth coil element L2b are coupled preferably in phase (subtractive polarity coupling).

Figure 14B:
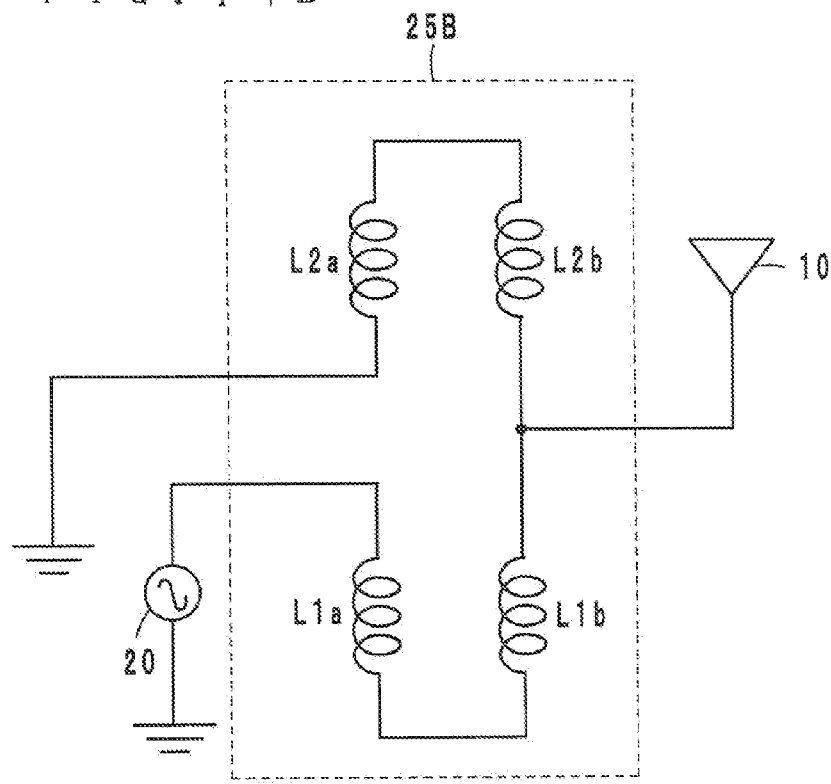

FIG. 14B is an equivalent circuit diagram of the impedance converting circuit 25B. FIG. 15A shows the transformer ratio of the impedance converting circuit 25B, and FIG. 15B shows magnetic-field coupling and electric-field coupling in the impedance converting circuit 25B.

As shown by FIG. 15B, when a current flows from the feed circuit 20 in a direction shown by arrow a, the current flows in the first coil element L1a in a direction shown by arrow b, and the current flows in the second coil element L1b in a direction shown by arrow c. These current flows generate a magnetic flux shown by arrow A (a magnetic flux passing through a closed magnetic path).

Since the coil elements L1a and L2a extend in parallel or substantially in parallel, the magnetic field generated by the current flow b in the coil element L1a is coupled with the coil element L2a, which generates an induced current d flowing in the coil element L2a in the opposite direction. Similarly, since the coil elements L1b and L2b extend in parallel or substantially in parallel, the magnetic field generated by the current flow c in the coil element L1b is coupled with the coil element L2b, which generates an induced current e flowing in the coil element L2b in the opposite direction. These current flows generate a magnetic flux shown by arrow B (a magnetic flux passing through a closed magnetic path).

Since the magnetic path A that is provided in the first inductance element L1 of the coil elements L1a and L1b is independent from the magnetic path B that is provided in the second inductance element L2 of the coil elements L2a and L2b, an equivalent magnetic wall MW is generated between the first inductance element L1 and the second inductance element L2.

The coil elements L1a and L2a are coupled with each other via an electric field. Similarly, the coil elements L1b and L2b are coupled with each other via an electric field. Accordingly, when an alternating current flows in the first inductance element L1a and L1b, a current is excited in the coil elements L2a and L2b due to the electric-field coupling. The capacitors Ca and Cb shown in FIG. 15B are capacities to provide the electric-field coupling.

When an alternating current flows in the first inductance element L1, the current flow in the second inductance element L2 generated by the magnetic-field coupling and the current flow in the second inductance element L2 generated by the electric-field coupling are in the same direction. Therefore, the first inductance element L1 and the second inductance element L2 are strongly coupled with each other via both a magnetic field and an electric field.

Equivalent conversion of the impedance converting circuit 25B results in the circuit shown by FIG. 15A. The combined inductance between the feed circuit 20 and the ground is, as shown by the alternate long and short dash line, L1+M+L2+M=L1+L2+2M, and the combined inductance between the radiation plate 10 and the ground is, as shown by the alternate long and two dashes line, L2+M−M=L2. Thus, the transformer ratio of the impedance converting circuit 25B is L1+L2+2M to L2. Hence, this impedance converging circuit 25B has a great transformer ratio.

Third Exemplary Impedance Converting Circuit

Figure 16:
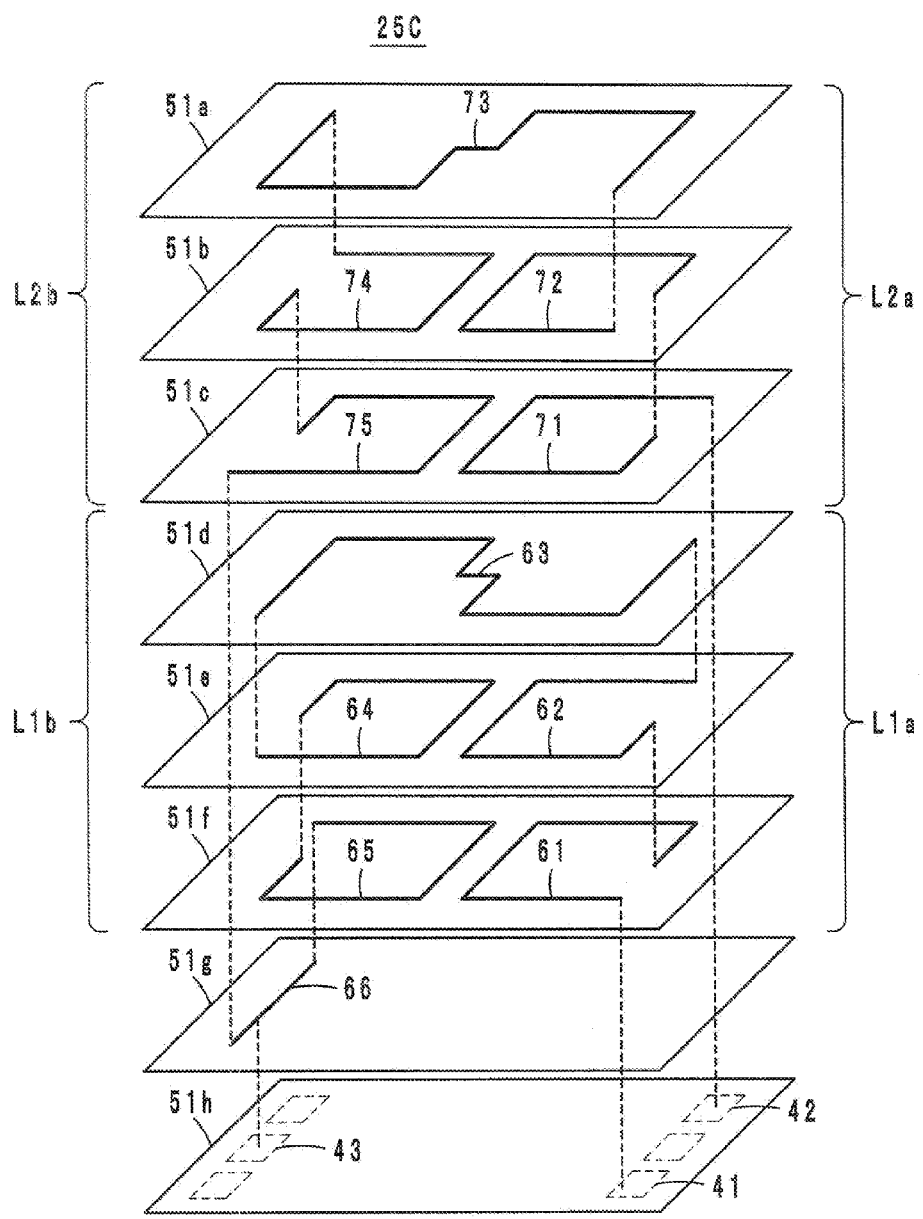
FIG. 16 is a perspective view of a multilayer substrate incorporating a third exemplary impedance converting circuit, showing conductive patterns provided on the respective layers of the multilayer substrate.

FIG. 16 shows a third exemplary impedance converting circuit 25C provided in a multilayer substrate. Base layers 51a to 51h of the substrate are magnetic sheets, and conductive patterns 61 to 66 and 71 to 75 are provided on the base layers 51a to 51g. Although the conductive patterns 61 to 66 and 71 to 75 are preferably provided on the back sides of the base layers 51a to 51g, the conductive patterns 61 to 66 and 71 to 75 are shown by solid lines in FIG. 16 for convenience sake. Although the conductive patterns 61 to 66 and 71 to 75 have a predetermined width, the conductive patterns 61 to 66 and 71 to 75 are shown by simple solid lines in FIG. 16.

The conductive pattern 73 is provided on the back side of the base layer 51a, and the conductive patterns 72 and 74 are provided on the back side of the base layer 51b. The conductive patterns 71 and 75 are provided on the back side of the base layer 51c. The conductive pattern 63 is provided on the back side of the base layer 51d, and the conductive patterns 62 and 64 are provided on the back side of the base layer 51e. The conductive patterns 61 and 65 are provided on the back side of the base layer 51f. The conductive pattern 66 is provided on the back side of the base layer 51g. A feed terminal 41, a grounding terminal 42 and an antenna terminal 43 are provided on the base layer 51h. The conductive patterns and the terminals are connected via interlayer conductors (via-hole conductors shown by dashed lines) as shown in FIG. 16.

The first coil element L1a is defined by the right half of the conductive pattern 63 and the conductive patterns 61 and 62. The second coil element L1b is defined by the left half of the conductive pattern 63 and the conductive patterns 64 and 65. The third coil element L2a is defined by the right half of the conductive pattern 73 and the conductive patterns 71 and 72. The fourth coil element L2b is defined by the left half of the conductive pattern 73 and the conductive patterns 74 and 75.

The winding axes of the coil elements L1a, L1b, L2a and L2b extend in a lamination direction of the multilayer substrate. The winding axes of the first coil element L1a and the second coil element L1b are located side by side, that is, in different positions when viewed from the top-bottom direction. The winding axes of the third coil element L2a and the fourth coil element L2b are located side by side, that is, in different positions when viewed from the top-bottom direction. A winding area of the first coil element L1a and a winding area of the third coil element L2a overlap with each other when viewed from the top-bottom direction, and a winding area of the second coil element L2a and a winding area of the fourth coil element L2b overlap with each other when viewed from the top-bottom direction. In this third exemplary impedance converting circuit 25C, the winding area of the first coil element L1a and the winding area of the third coil element L2a are located almost completely one upon the other, and the winding area of the second coil element L2a and the winding area of the fourth coil element L2b are located almost completely one upon the other. Thus, the four coil elements are defined by the figure-eight-shaped conductive patterns.

The base layers 51a to 51h may be dielectric sheets, for example. However, by using magnetic sheets with high relative magnetic permeability, the coupling coefficients between the coil elements can be heightened.

FIG. 17 shows major magnetic fluxes passing through the coil elements including the conductive patterns provided on the base layers of the multilayer substrate shown by FIG. 16. The magnetic flux FP12 passes through the first coil element L1a defined by the conductive patterns 61 to 63 and the second coil element L1b defined by the conductive patterns 63 to 65. The magnetic flux FP34 passes through the third coil element L2a defined by the conductive patterns 71 to 73 and the fourth coil element L2b defined by the conductive patterns 73 to 75.

Fourth Exemplary Impedance Converting Circuit

In a fourth exemplary impedance converting circuit 25D, the coil elements L1a, L1b, L2a and L2b are magnetically coupled. Specifically, the first coil element L1a and the second coil element L1b are wound to define a first closed magnetic path (a loop shown by a magnetic flux FP12), and the third coil element L2a and the fourth coil element L2b are wound to define a second closed magnetic path (a loop shown by a magnetic flux FP34). The coil elements L1a, L1b, L2a and L2b are wound such that the magnetic flux FP12 passing through the first magnetic path and the magnetic flux FP34 passing through the second magnetic path 34 are in the opposite direction to each other. The alternate long and two short dashed line in FIG. 18 shows a magnetic wall to obstruct coupling between the two magnetic fluxes FP12 and FP34.

Other Preferred Embodiments

Communication terminal devices and manufacturing methods thereof according to the present invention are not limited to the preferred embodiments above, and various changes and modifications are possible within the scope of the present invention.

The detailed structures and the detailed shapes of the radiation portion and the lead portion of the radiation plate can be designed arbitrarily, and the detailed structure and the detailed shape of the printed wiring board can be designed arbitrarily.

As described above, preferred embodiments of the present invention are effectively applicable to communication terminal devices, and preferred embodiments of the present invention provide an advantageous effect of preventing degradation of the antenna characteristics.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A communication terminal device comprising:
a printed wiring board disposed in a casing;
a feed pattern provided on a main surface of the printed wiring board;
a radiation plate including a planar radiation portion arranged perpendicular or substantially perpendicular to the main surface of the printed wiring board and a lead portion that connects the radiation portion to the feed pattern; and
a component mounted on a main surface of the printed wiring board in an area that overlaps the lead portion when the main surface of the printed wiring board is viewed in a top-bottom direction, the component including at least one of a conductive material, a magnetic material and a dielectric material; wherein
the radiation portion is connected to the lead portion at an upper portion of the radiation portion spaced away from the printed wiring board by a greater distance than a distance from the printed wiring board to a lower portion of the radiation portion opposite to the upper portion in the top-bottom direction; and
the lead portion, in the area overlapping the component when the main surface of the printed wiring board is viewed in the top-bottom direction, is located at a predetermined distance from the main surface of the printed wiring board.

2. The communication terminal device according to claim 1, wherein a portion of the lead portion overlapping the component when the main surface of the printed wiring board is viewed in the top-bottom direction is parallel or substantially parallel to the main surface of the printed wiring board.

3. The communication terminal device according to claim 1, wherein
the radiation portion has a long-side direction that is parallel to the main surface of the printed wiring board and a short-side direction that is perpendicular to the main surface of the printed wiring board;
both ends of the radiation portion in the long-side direction are open ends; and
the radiation portion is connected to the lead portion at a center or substantially a center in the long-side direction.

4. The communication terminal device according to claim 1, wherein the radiation portion includes a holding portion that fixes the radiation portion to the printed wiring board.

5. The communication terminal device according to claim 1, wherein the radiation portion and the lead portion are defined by a bent single thin metal sheet.

6. The communication terminal device according to claim 1, further comprising a casing arranged to contain the printed wiring board.

7. The communication terminal device according to claim 1, wherein the communication terminal device is compatible with at least one of a dual-band system, a triple-band system, a quad-band system, a penta-band system, and a Long Term Evolution system.

8. The communication terminal device according to claim 1, wherein the feed pattern connects a feed circuit to an impedance converting circuit.

9. The communication terminal device according to claim 1, wherein the feed pattern connects an impedance converting circuit to the radiation plate.

10. The communication terminal device according to claim 1, wherein the component is a key pad.

11. The communication terminal device according to claim 1, wherein the component is a switch that turns on and off the communication terminal device.

12. The communication terminal device according to claim 1, wherein the component includes contact members and a resin film.

13. The communication terminal device according to claim 1, wherein the radiation portion is one of straight and planar, substantially straight and substantially planar, U-shaped, or substantially U-shaped.

14. The communication terminal device according to claim 1, wherein the component is a connector.

15. The communication terminal device according to claim 14, wherein the connector includes conductors and a conductive pattern.

16. The communication terminal device according to claim 1, wherein the component is a speaker including a current-carrying conductor.

17. The communication terminal device according to claim 4, wherein the holding portion is attached to a lower edge of the radiation portion and a lower end of the lead portion and is soldered to lands and the feed pattern located on the main surface of the printed wiring board.

18. The communication terminal device according to claim 1, wherein the radiation plate is disposed along an end surface of the printed wiring board.

19. A method for manufacturing the communication terminal device according to claim 1, wherein the lead portion is sucked by a suction nozzle and is placed on the printed wiring board.

20. The communication terminal device according to claim 1, wherein
the main surface on which the feed pattern is provided is a first main surface of the printed wiring board; and
the main surface on which the component is mounted is a second main surface of the printed wiring board.

21. The communication terminal device according to claim 20, wherein the feed pattern is spaced away from the component, when the first main surface of the printed wiring board is viewed in the top-bottom direction.

22. The communication terminal device according to claim 20, wherein the lead portion extends toward the feed pattern from a portion connected to the radiation portion, while maintaining the predetermined distance from the first main surface of the printed wiring board, in the area overlapping the component when the one main surface of the printed wiring board is viewed in the top-bottom direction.

* * * * *